(12) United States Patent
Segal

(10) Patent No.: US 6,347,338 B1
(45) Date of Patent: *Feb. 12, 2002

(54) PRECOMPUTED AND DISTRIBUTED SECURITY SYSTEM FOR A COMMUNICATION NETWORK

(75) Inventor: Edward Robert Segal, White Plains, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/978,770

(22) Filed: Nov. 26, 1997

(51) Int. Cl.[7] .............................................. G06F 15/16
(52) U.S. Cl. ...................... 709/229; 709/244; 709/245; 709/246; 713/163; 713/200; 713/201
(58) Field of Search ................................ 709/229, 244, 709/245, 246; 713/201, 200, 163

(56) References Cited

U.S. PATENT DOCUMENTS

| | | | |
|---|---|---|---|
| 5,416,842 A | 5/1995 | Azia | 380/30 |
| 5,548,646 A | 8/1996 | Aziz | 380/23 |
| 5,623,601 A | 4/1997 | Vu | 395/187.01 |
| 5,748,736 A | * 5/1998 | Mittra | 380/21 |
| 5,828,893 A | * 10/1998 | Wied et al. | 709/229 |
| 5,835,726 A | * 11/1998 | Shwed et al. | 709/229 |

OTHER PUBLICATIONS

Bellovin, S.M "Network firewalls," IEEE communications magazines, p. 50–57, Sep. 1994.*

U.S. application No. 08/979,037, Segal., filed Nov. 26, 1997.

U.S. application No. 08/979,863, Segal., filed Nov. 26, 1997.

U.S. application No. 08/977,768, Segal., filed Nov. 26, 1997

* cited by examiner

Primary Examiner—Glenton B. Burgess
Assistant Examiner—Hieu C. Le
(74) Attorney, Agent, or Firm—Casey P. August; Michael J. Buchenhorner; Fleit, Kain, Gibbons, Gutman & Bongini P.L

(57) ABSTRACT

In a data communication network, a system for protecting parts of the network. The system comprises a plurality of user nodes linked together within the network. Each user node comprises means for transmitting list indicating to other nodes in the network the identification of allowed senders and receivers; and two or more security nodes within the network; each security node detects transmission and relays each signal only to the recipients specified in the list.

18 Claims, 4 Drawing Sheets

PRECOMPUTED AND DISTRIBUTED SECURITY SYSTEM FOR A COMMUNICATION NETWORK

BACKGROUND OF THE INVENTION

The present invention relates to computers and computer networks and more specifically to a system for providing distributed security and protection in a computer network.

Data communications is of great importance to businesses today. A principal function of computers is to perform communications functions over various computer networks such as local area networks (LANs), wide area networks (WANs) and the Internet. Given the critical nature of much of the information that is transmitted on networks, security has become a great concern to users of such networks. The magnitude of the concern has been increased by the popularity of the Internet with the advent of the World-Wide Web (WWW) which has provided user-friendly access to thousands of users to a global network of computers and smaller networks all linked together.

Thus, it is becoming increasingly important to provide network access that is reliable and has a higher degree of security. It is also desirable to provide control over the granting of "permission" to utilize the network. It is also important to provide protection against overutilization and unfair utilization of network resources and from the growing number and various types of "Denial of Service" attacks.

One common solution to the security problem in networks has been to provide one large, complex, centralized firewall, that often has to deal with a very large amount of traffic coming through it from all the various paths from many networks. These firewall units are generally large computers having the means to filter information coming into the protected network and to limit access to the protected network. FIG. 1 is a block diagram of a data network 10 having a conventional centralized firewall node 12 at a gateway station. The firewall node 12 protects communications between an unprotected public network 14 (e.g., the Internet) and a private protected network 16. The network 16 can be any of various private networks and it may be comprised of various computers, servers, systems, etc. 18–24. As the size of each network increases so do the demands upon firewall unit 12 which must process all incoming and outgoing data traffic possibly from a vast global network.

Routes in a network are provided to indicate reachability to destinations. They inform where to send to reach destinations. Currently, general networking practice is to send routes to every router in a network, to the entire (inter) corporate net or autonomous system and then at run time try to have built a firewall that is syntactically correct and fast enough to keep undesired traffic out. This is very difficult to begin with and does not even prevent all problems such as denial of service attacks and attacks which simply overwhelm the network links and/or the firewall devices and intermediate routers and bridges with more packets than they can filter per unit time, therefore effectively blocking out desired traffic and preventing legitimate users from using the system.

U.S. Pat. No. 5,416,842 relates to a method and apparatus for a key-management scheme for use with internet protocols at site firewalls. It requires encryption and is very processor intensive. It is a centralized approach to the network security problem that is vulnerable to attacks that can overwhelm the unit.

U.S. Pat. No. 5,623,601 relates to an apparatus and method for providing a secure gateway for communication and data exchanges between networks. This discusses a network security system that requires every communication to go through a single gateway that must perform all the processing and is vulnerable to overloading.

U.S. Pat. No. 5,548,646 requires the use of encryption for every secure transmission and every transmission must undergo examination to determine if additional security is needed. Thus, every packet requiring security must undergo additional computing steps to encrypt it at the sender's site. Additional computation is required to encapsulate the transmission at the sender side. Additional time consumption occurs at the receiving side which must decrypt (and in many cases, decapsulate) secure messages. The system described in this patent could become a performance bottleneck under a heavy load and appears vulnerable to "denial of service attacks".

Most known network security systems depend on one centralized unit to handle communications for each network. One method seems to briefly recognize this as a significant limitation but does not really suggest a good solution and is a limited method anyway that is still subject to denial of service attacks. Publications IDP (rfc 1479) and IDRP mention some methods that could increase security.

Most need a device that has enough capacity to handle all traffic going into and out of the network. Most need complex setup protocols and/or security keys. Many require encryption. Most are not distributed and typically require higher level processing for each communication which is processor intensive and time consuming.

SUMMARY OF THE INVENTION

Briefly, in accordance with the invention, the present situation can be improved upon by limiting access to nodes, routes and other networking devices. Routers, firewalls, ingress nodes, and switches could be informed which destination networks and routes should be allowed to which source nodes or networks. A security filtering system enables distributed granting of admission to transmission of signals on to the network, and means for providing distributed admission control, and for providing a distributed firewall. The distributed security system provides a protocol for transmitting to a node location and a list of nodes or networks that are allowed access to the various nodes and services.

BRIEF DESCRIPTION OF THE DRAWING(S)

DESCRIPTION OF THE ILLUSTRATIVE EMBODIMENT(S)

Figure 1:
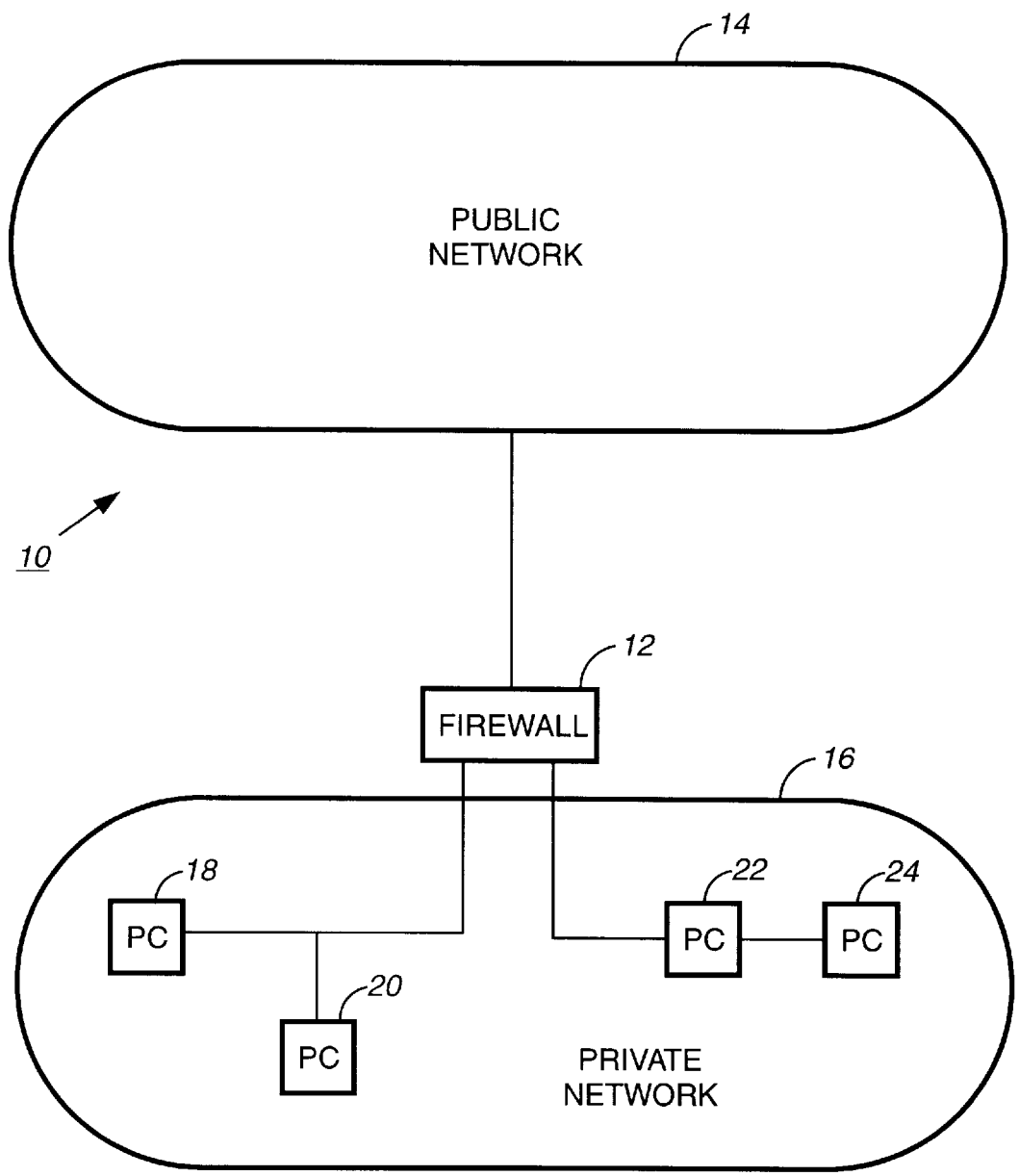
FIG. 1 is a block diagram of a data network having a conventional firewall node.
Figure 2:
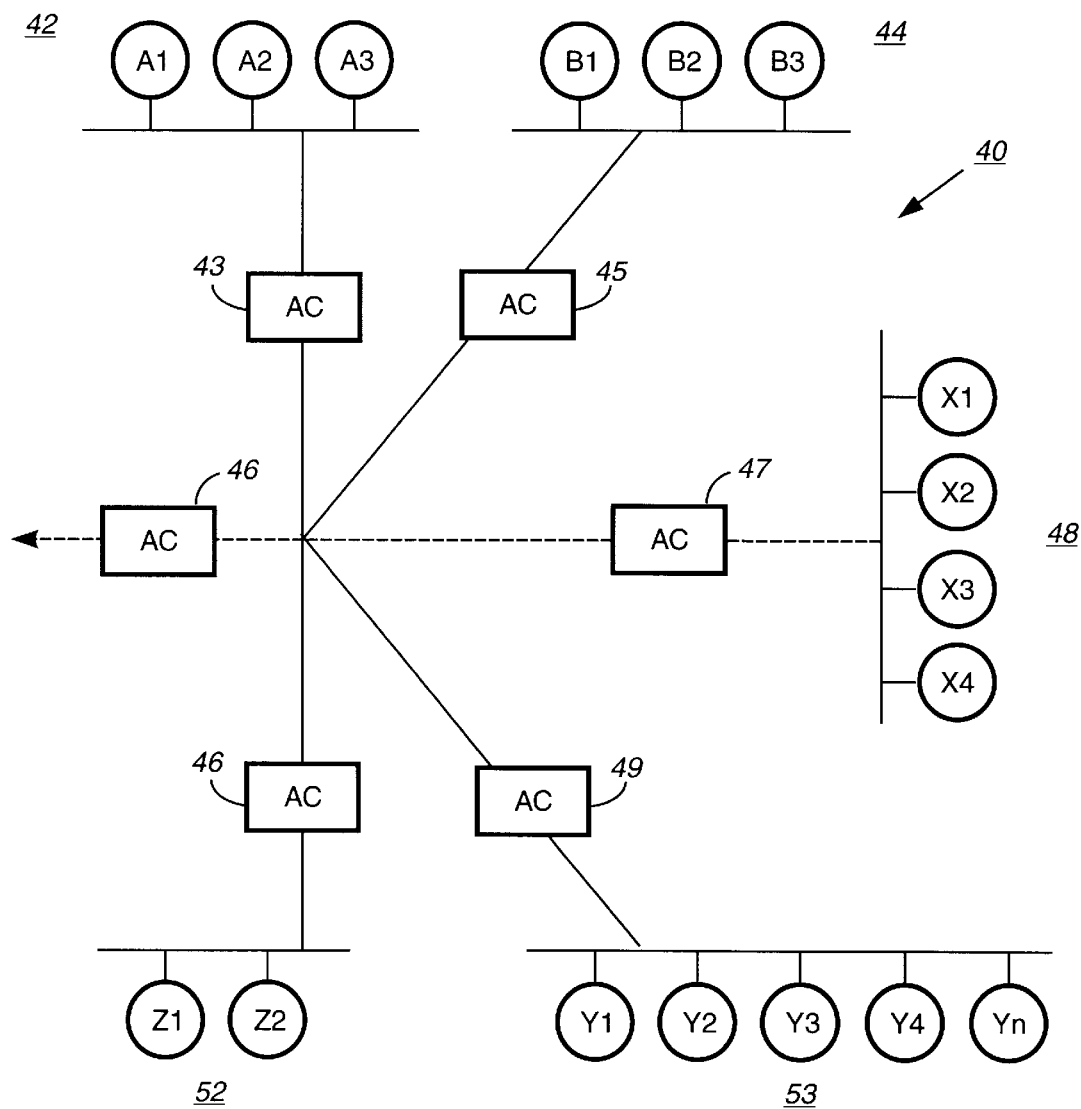
FIG. 2 shows a data network having a distributed security system in accordance with the invention.

FIG. 2 shows a data network 40 having a distributed firewall in accordance with the invention. Network 40 comprises various subnetworks 42, 44, 48, 52, and 53, and security units at access points (ACs) 43, 45, 46, 47, 49, and 50. The network 40 can be any network, such as the Internet, that links networks together. Each subnetwork can include a different protocol, for example any of these could be a connection-oriented network such as an asynchronous transfer mode (ATM) or frame relay type network. Each security unit resides at a node that provides a coupling or connection for at least one node to other nodes in the network 40. In one possible embodiment, units 43, 45, 46, 47, 49, and 50 are servers operated by Internet Service Providers (ISPs). In another embodiment, the security units are simply access points to a network or subnetwork. Those access points can be occupied by a switch such as an ATM switch, a PBX (private branch exchange) switch, an Internet router, or a conventional central office switch. In accordance with the invention, the network 40 the units 43, 45, 46, 47, 49, and 50 each comprise a shared list setting forth a plurality of listed nodes and a set of access privileges for each listed node. Access privileges are the types of transmissions that a given node listed in the shared list is permitted to make. The types of transmissions may be classified as transmissions permitted from only certain nodes, Internet Service Providers (ISPs), or certain clients of specified ISPs. The type of permitted (or allowed) transmissions can also be limited to transmissions directed at certain ports or sockets of the destination (or target) node or unit. For example, consider the case where node B1 is a computer or LAN at an accounting firm. The firm may want to restrict the nodes from which it receives or transmits E-mail or certain types of transmissions (i.e. File Transfer Protocol (FTP) or World-Wide-Web transmissions). In this case, the firm wishes to receive e-mail only form its clients Z1, Y2, and X4. Node B1 would instruct node 45 to provide that the shared list residing at security node 45 would intercept all e-mail and only allow e-mail from nodes Z1, Y2 and X4 but in this distributed system, it is also possible for security node 49 to only allow e-mail from Y2, node 50 prohibits e-mail form Z2 and so forth. Thus, with the cooperation of other nodes, it is virtually impossible to overwhelm node 45 with unpermitted transmissions. The shared list may provide with respect to any listed node that it can only transmit to certain other listed nodes and, with respect to those nodes it can transmit to, restrictions applicable to such transmissions.

In connection-oriented networks (i.e., those wherein an entry point to a network assigns a connection identifier to an originating node, allowing it to transmit to a specified destination) access control can be provided by granting connection identifiers only to those nodes permitted in the shared list. This can be accomplished in connection-oriented networks because each access point (e.g., an ATM switch) can use the information stored to discriminate among the nodes that it will grant connection identifiers and those it will deny such identifiers. For example, an access point in an ATM network can deny virtual connections (VC, a form of connection identifier) to those nodes not permitted by the shared list. In fact the information provides the capability in a connection-oriented network to achieve greater granularity of control by basing admission criteria on any of the items of information that can be detected from the transmission. Thus the list of permitted connections or access privileges can have any desired granularity.

The situation can be improved upon by providing a set of firewall-type commands that include lists of which nodes, sources, networks are allowed to use certain destinations. These commands can be utilized by filtering devices and /or security devices such as firewalls, ingress nodes, switches, which would be informed which destination nodes, addresses, ports, are permitted to which source nodes or networks. These filtering devices and /or security devices may be separate stand-alone components or their capability may be integrated into other, possibly already existing, devices.

It is desirable to provide control over the granting of permission to utilize the network and protection against overutilization and unfair utilization of network resources from the growing number and various types of "denial of service" attacks. In accordance with the invention, such control and protection are achieved by establishing a system of node access lists. The list is shared among various security devices.

Figure 3:
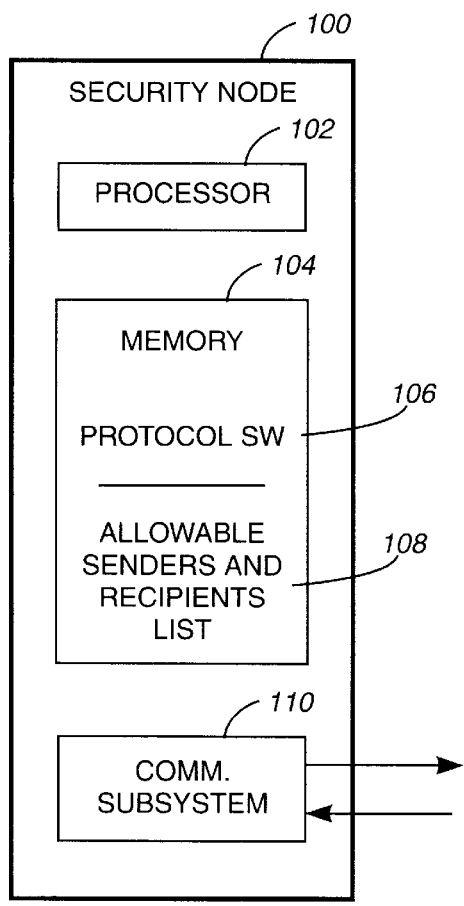
FIG. 3 shows a security node comprising an information handling system in accordance with the invention.

Referring to FIG. 3, there is shown a network node that comprises an information handling unit (e.g., a computer) comprising a processor unit 102, a memory subsystem (including RAM, ROM, and/or hard disk storage) 104, and a communication subsystem 110 which can be any of several well-known communication adapters for communicating with other nodes in the network. The memory 104 includes software such as network protocol program 106, and an allowable sender and recipient list 108 for transmissions. This list can be maintained in the unit 100 or received from nodes on the network.

Figure 4:
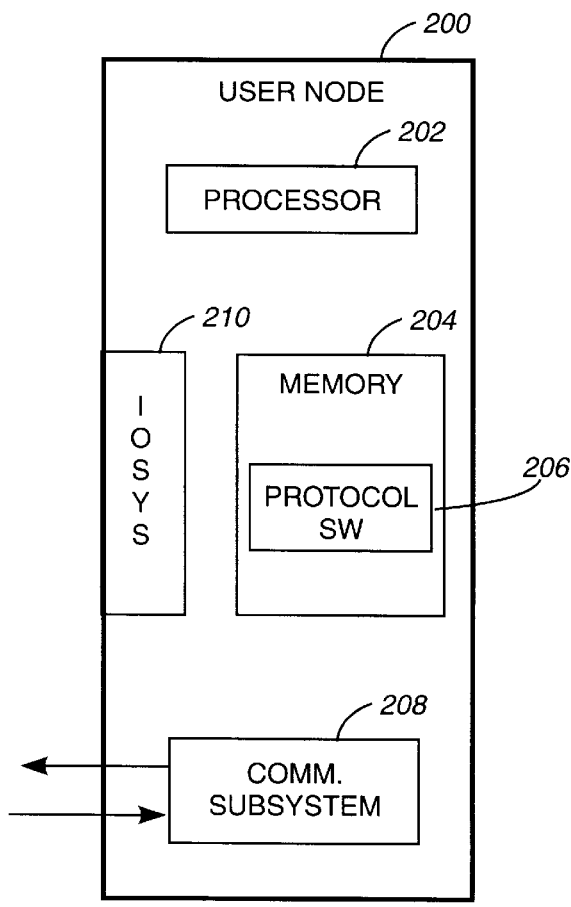
FIG. 4 shows a user node comprising an information handling system in accordance with the invention.

Referring to FIG. 4, there is shown a user node that comprises an information handling unit 200 (e.g., a computer) comprising a processor unit 202, a memory subsystem (including RAM, ROM, and/or hard disk storage) 204, and a communication subsystem 208 which can be any of several well-known communication adapters and a modem for communicating with other nodes in the network. The memory 204 includes software such as a network protocol program 206, that includes the functionality shown in FIG. 4.

Figure 5:
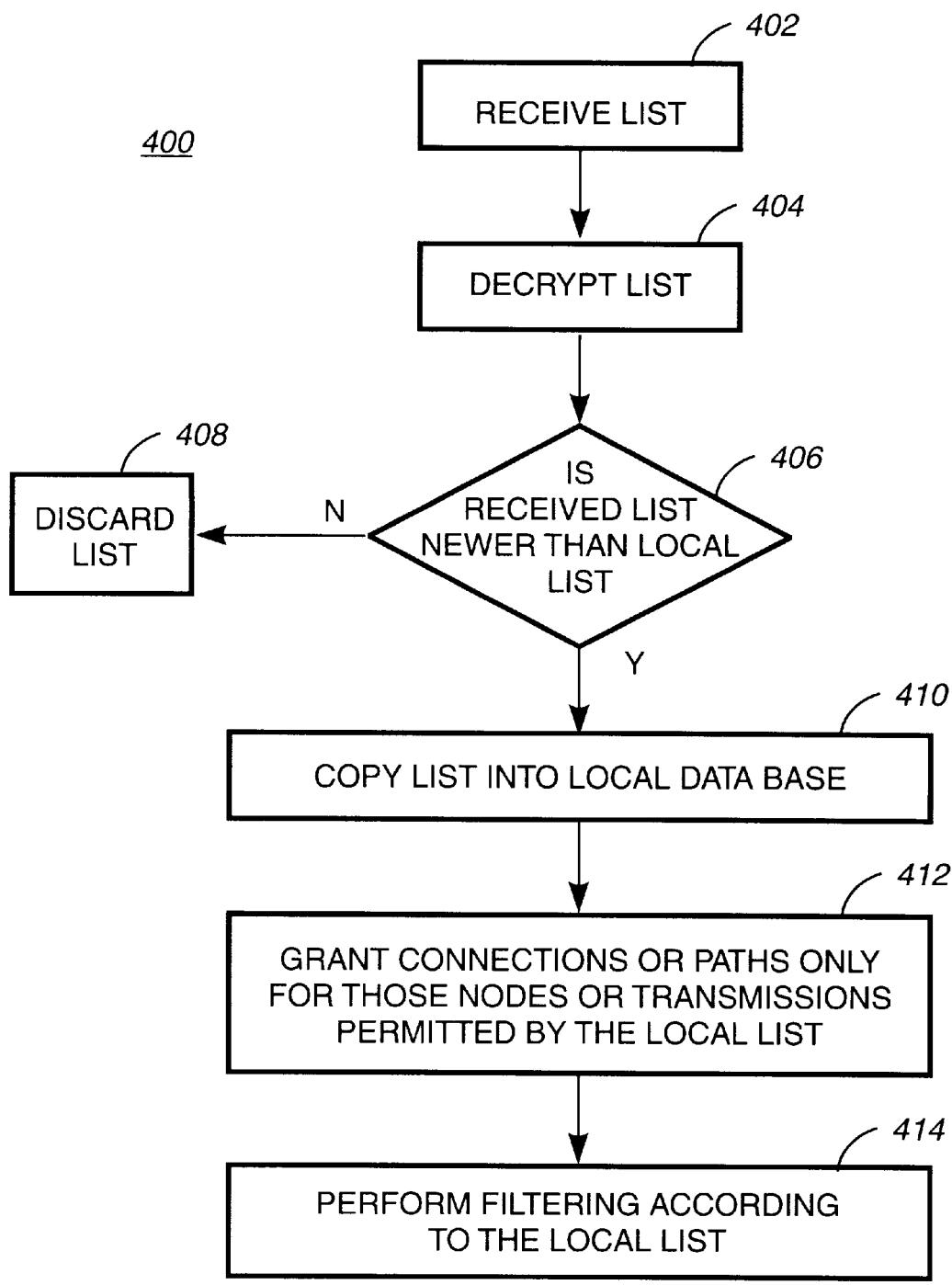
FIG. 5 is a flow chart showing how a security node provides network security in accordance with the invention.

FIG. 5 is a flow chart illustrating a method 400 in accordance with the invention. In step 402, a node comprising a security device receives the encrypted list. In step 404, the receiving security device decrypts the received list. A decision 406 is then made to determine whether the received list is newer than the local list. If it is not, the received list is discarded in step 408. If the received list is newer than the local list, the received list is copied into the local database (i.e, storage) in step 410. In step 412 connections or paths are only granted for nodes or transmissions permitted by the local list. Thus, a security device in the network does not send connection information such as VP (virtual path), VCs, connection identifiers etc., for any destinations to which a node is not allowed to transmit, according to the list of permitted nodes. The security unit only places on a VP, VC, connection identifiers, transmissions contained in the list. Moreover, no VPs, VCs, connections etc. will be set up which are not allowed to transmit. The security device can also accomplish step 412 by not making any entry in VP, VC, cross connect, switching tables etc. connecting a node to any destination which is not allowed to access according to the list of permitted nodes. Any transmission for a network or node that does not have a valid VP, VC, connection identifier, etc. is rejected as being errored. The errors may be reported to the appropriate network management if desired. Then in step 414, the security unit filters received transmissions in accordance with the most recent local list.

The system presented allows for inter-firewall cooperation and sharing the load between various filtering and security devices. This provides for a distributed firewall capability and also permits (multiple) smaller firewalls and/or admission control points. It also allows sharing the load. Information on which networks and nodes should be granted access could be transmitted to the distributed elements.

While the invention has been illustrated in connection with a preferred embodiment, it will be understood that many variations will occur to those of ordinary skill in the art, and that the scope of the invention is defined only by the claims appended hereto and equivalents.

What is claimed is:

1. In a connection-oriented communication network comprising a first firewall-protected subnetwork having a plurality of nodes and at least one other firewall-protected subnetwork having a plurality of nodes, the other firewall-protected subnetwork including a second firewall security node for coupling the nodes in the other firewall-protected subnetwork to the first firewall-protected subnetwork, the first firewall-protected subnetwork comprising:

a first firewall security node for coupling the nodes in the first firewall-protected subnetwork to the other firewall-protected subnetwork, wherein the first firewall security node includes a shared list setting forth a plurality of listed nodes and access privileges for each of the listed nodes, the shared list being an identical list shared by the first and second firewall security nodes and being used by each of the firewall security nodes to filter transmissions to and from the other firewall-protected subnetworks of the network in accordance with the access privileges set forth in the shared list so as to protect the first firewall-protected subnetwork, and at least one node in the first firewall-protected subnetwork instructs the first firewall security node to provide that the shared list residing at the first firewall security node filter all transmissions to the one node and permit only a set of allowable types of transmissions specified by the one node.

2. The security system of claim 1 wherein each shared list comprises a set of permitted destination addresses for each of the listed nodes and wherein each of the listed nodes is permitted to transmit to each of its associated permitted addresses.

3. The security system of claim 1 wherein each shared list comprises, for each listed node, a field for specifying a set of network service providers from which transmissions are to be accepted.

4. The security system of claim 3 wherein each shared list comprises, for each listed node, a field for specifying a set of nodes of the specified network service providers from which transmissions are to be accepted.

5. The security system of claim 1 wherein each shared list comprises, for each listed node, a field for specifying a set of allowable types of transmissions.

6. The security system of claim 5 wherein the allowable types of transmissions comprise e-mail transmissions only.

7. The security system of claim 5 wherein the allowable types of transmissions comprise World-Wide-Web transmissions only.

8. The security system of claim 1 wherein each shared list comprises, for each listed node, a field for specifying a port for the listed node to which transmissions are permitted.

9. The security system of claim 1 wherein each shared list comprises, for each listed node, a field for specifying a socket for the listed node to which transmissions are permitted.

10. In a connection-oriented communication network comprising a first firewall-protected subnetwork having a plurality of nodes and a first firewall security unit, and at least one other firewall-protected subnetwork having a plurality of nodes and a second firewall security unit, each of the firewall security units residing at an access node for coupling one firewall-protected subnetwork to another firewall-protected subnetwork, said first firewall security unit comprising:

means for receiving, from a source node a request for a connection with a destination node;

storage means for storing a shared list of connection privileges for a set of nodes among the plurality of nodes in the network, and access means for granting a connection from the source node to the destination node only when such a connection is permitted by the connection privileges in the shared list, wherein the shared list is an identical list shared by the first firewall security unit of the first firewall-protected subnetwork and the second firewall security unit of the other firewall-protected subnetwork, the shared list is used by each firewall security unit to filter transmissions to and from the other firewall-protected subnetworks of the network in accordance with the access privileges set forth in the shared list, and at least one node in the first firewall-protected subnetwork instructs the first firewall security unit to provide that the shared list residing at the first firewall security unit filter all transmissions to the one node and permit only a set of allowable types of transmissions specified by the one node.

11. The security unit of claim 10 wherein the storage means comprises the list of connection privileges.

12. The security unit of claim 10 wherein the list comprises a set of destination nodes permitted for each listed node.

13. The security system of claim 10 wherein each shared list comprises, for each listed node, a field for specifying a set of allowable types of transmissions.

14. The security system of claim 13 wherein the allowable types of transmissions comprise e-mail transmissions only.

15. The security system of claim 13 wherein the allowable types of transmissions comprise World-Wide-Web transmissions only.

16. The security system of claim 10 wherein each shared list comprises, for each listed node, a field for specifying a port for the listed node to which transmissions are permitted.

17. The security system of claim 10 wherein each shared list comprises, for each listed node, a field for specifying a socket for the listed node to which transmissions are permitted.

18. The first firewall-protected subnetwork of claim 1, wherein the first firewall security node is the only firewall security node in the first firewall-protected subnetwork, such that any transmission from the first firewall-protected subnetwork to the other firewall-protected subnetwork passes through the first firewall security node and no other firewall security node before being transmitted from the first firewall-protected subnetwork to the second firewall security node of the other firewall-protected subnetwork.

* * * * *